Patented Apr. 11, 1950

2,503,290

UNITED STATES PATENT OFFICE 2,503,290

LUBRICANT COMPOSITION

Henry D. Norris, Woodbury, N. J., and John H. McCracken, Tulsa, Okla., assignors to Socony-Vacuum Oil Company, Incorporated, a corporation of New York No Drawing. Original application May 10, 1947, Serial No. 747,327. Divided and this application July 3, 1948, Serial No. 37,078

3 Claims. (Cl. 252—48.8)

This invention relates to an improved mineral oil composition and, more particularly, is directed to a lubricant comprising in combination a major proportion of a mineral oil and a minor proportion, sufficient to improve the extreme pressure characteristics of the oil, of hexachlorothiolane.

The chlorination of thiophene has heretofore been undertaken to produce monochlorothiophene and various polychlorothiophenes. It has been reported that during the course of the chlorination reaction, hydrogen chloride addition products of thiophene and chlorothiophenes are formed. These products have previously been considered very unstable and none has been isolated. The recommended literature method for removing said addition products from the chlorinated reaction mixture has involved contacting said mixture for a rather long time with alcoholic potassium hydroxide at the boiling point of the alcohol. Monochlorothiophenes are obtained from the reaction mixture so treated by precipitating with water, steam-distilling and fractionating to yield, as products, monochloro-, dichloro-, trichloro-, and tetrachlorothiophene.

In accordance with the present invention, it has now been found that if the chlorination of thiophene is carried out employing at least 2 moles of chlorine per mole of thiophene, the reaction products so obtained are stable and show no tendency to release hydrogen chloride as a result of partial decomposition. It has further been discovered that upon fractionation of the reaction product mixture so obtained, a new compound can be isolated, which has been identified, by methods hereinafter described, to be hexachlorothiolane. This new composition of matter is a lubricating oil addition agent and is particularly adapted for use as an additive in extreme pressure lubricants. Moreover, as those skilled in the art will recognize, the new compound of this invention, by reason of the high activity of its chlorine atoms, will serve as a useful chemical intermediate in the synthesis of further new compositions.

It is, accordingly, an object of the present invention to provide a new lubricating oil addition agent. Another object is to provide a process for synthesizing hexachlorothiolane. A still further object is the provision of an improved mineral oil composition comprising a major proportion of an oil of lubricating viscosity and a minor proportion of hexachlorothiolane. Other objects and advantages of the present invention will be apparent to those skilled in the art from the following description.

The process of this invention comprises the chlorination of thiophene, employing a molar ratio of chlorine to thiophene of at least 2:1, and preferably higher, to yield a new composition of matter, namely, hexachlorothiolane, which can be separated from the chlorinated byproducts present by fractionation, preferably under reduced pressure. In its preferred aspects, the present invention comprises the exhaustive chlorination of thiophene, that is, continual chlorination until the total weight of chlorinated products is no longer increased upon further chlorination. Exhaustive chlorination is preferable, since this operation has been found to give the highest yields of the new compound. With other reaction conditions remaining constant, lower yields in decreasing amounts are obtained as the ratio of chlorine to thiophene is reduced. When the molar ratio of chlorine to thiophene falls below about 2:1, partial decomposition of the chlorinated products becomes evident and little or none of the desired compound of this invention is then obtained. Accordingly, the chlorination process to be employed herein does not contemplate the use of a reaction mixture containing a molar ratio of chlorine to thiophene of less than about 2:1.

The chlorination reaction of the present invention will generally be carried out at a temperature varying between about 0° C. and about 200° C., preferably at a temperature between about 40° C. and about 160° C. and a reaction time sufficient to effect an exhaustive chlorination of thiophene. As the chlorination reaction proceeds upon addition of gaseous chlorine to thiophene, the temperature of the reaction mixture rises. The rate at which chlorine is added to thiophene will be such as to maintain a reaction temperature below about 200° C. and preferably, as shown hereinafter, below about 160° C. The rate at which chlorine is added to thiophene to attain the exhaustive chlorination thereof described above will generally be between about 1 and about 4 liters per minute. At reaction temperatures above about 200° C., the yield of hexachlorothiolane is merely a trace in comparison to those amounts obtained in the lower temperature range, preferably from about 40° C. to about 160° C. At temperatures between about 160° C. and about 200° C., comparatively small yields of desired product are obtained so that while the operable temperature range for the process of this invention appears to be between about 0° C. and about 200° C., the preferred range is between about 40° C. and about 160° C. A convenient method of contacting thiophene and chlorine has been found to be under conditions of reflux. In such instances, the initial temperature will accordingly be about 80° C. and will rise upon addition of chlorine, being preferably controlled below about 160° C.

The method of the present invention accordingly comprises chlorinating thiophene at a temperature between about 0° C. and about 200° C., preferably between about 40° C. and about 160° C. to a point where the molar ratio of chlorine to thiophene is at least 2:1, and thereafter fractionating the resulting mixture to yield hexachlorothiolane as a new composition of matter. The reaction will generally be carried out in the absence of a catalyst. However, under certain conditions, particularly in lower temperature ranges, certain chlorination catalysts, such as phosphorus trichloride and bromine, have been found to yield desirable results.

Hexachlorothiolane, obtained by the above described procedure, is a colorless substance having a melting point of 45–46° C. and a boiling point of 131–132° C. at a pressure of 12 millimeters of mercury. The super-cooled liquid has a specific gravity of 1.735 at 30° C. compared to that of water at 4° C. and a refractive index at 50° C. of 1.5590. The formula of hexachlorothiolane is $C_4H_2SCl_6$. The hexachlorothiolane obtained by the above described process had the following analysis:

|  | Analysis | Theoretical |
| --- | --- | --- |
|  | Per Cent | Per Cent |
| Chlorine | 71.81 | 72.15 |
| Sulfur | 10.82 | 10.87 |
| Carbon | 16.31 | 16.29 |
| Hydrogen | 0.64 | 0.68 |

An infra-red absorption spectra study of the compound showed that it had lost all characteristics of thiophene and that there was no olefinic linkage present. Further evidence of the structure of hexachlorothiolane was shown by reaction of the compound with zinc dust. As is well known to those skilled in the art, dihalogen compounds of the nature —CHCl—CHCl— dehalogenate upon treatment with zinc dust to produce olefins. The compound of this invention upon treatment with zinc dust gave a product mixture which analysis showed to contain a small amount of thiophene, a small amount of 2-chlorothiophene, and more than 80 per cent of 2,5-dichlorothiophene.

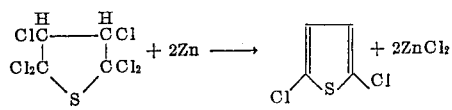

In accordance with the present invention, hexachlorothiolane may be obtained by subjecting thiophene to exhaustive chlorination either in the absence of a catalyst or in the presence of certain halogenation catalysts such as phosphorus trichloride and bromine, which when employed will usually be present in amounts usually in the range of from about .0005 to about 0.1 mole of catalyst per mole of thiophene. Thus, having described in detail a new composition of matter and method of making the same, the following examples will serve to illustrate the chlorination process of this invention without limiting the same:

*Example 1*

Ten moles (840 grams) of thiophene were chlorinated with gaseous chlorine at a rate of 4 liters per minute until 40 moles of chlorine had been added. The chlorine was measured by a rotameter. The liquid reactants were kept under reflux, the temperature rising as the chlorination proceeded from 84° C. to 153° C. The hot reaction mixture was blown with nitrogen for 15 minutes at the end of the chlorine addition to yield 1300 grams of chlorinated material. This product was fractionated under reduced pressure to give a yield of 21.7 per cent by weight of 2,2,3,4,5,5-hexachlorothiolane.

*Example 2*

Ten moles (840 grams) of thiophene were chlorinated with gaseous chlorine at a rate of 3–4 liters per minute until 68.3 moles of chlorine had been added. The liquid reactants were kept under reflux during addition of the first 46.3 liters of chlorine. The temperature rose during that period from 80° C. to 133° C. During the latter part of the chlorination the temperature fell from 130° C. to 105° C. The chlorinated material was washed with water, 5 per cent aqueous solution of sodium carbonate and a 5 per cent aqueous solution of sodium thiosulfate; again washed with a 5 per cent aqueous solution of sodium carbonate; and finally washed again with water. The washed product was dried over sodium sulfate and fractionated under reduced pressure. From 1786 grams of chlorinated material, 1431 grams of 2,2,3,4,5,5-hexachlorothiolane were obtained, representing a yield of 80.2 per cent.

*Example 3*

Two moles (170 grams) of thiophene were placed in a chlorination flask and 20 grams of a catalyst of bromine were added dropwise with cooling to keep the temperature below 20° C. The bromine completely reacted. Chlorine was then bubbled into the cooled reaction flask at a temperature of 40° C. for one hour and then the chlorination temperature was allowed to increase to 55–60° C. Chlorination was continued at this temperature until the temperature started to fall, indicating that the thiophene was completely chlorinated. The period required for complete chlorination was about 6 hours. The resulting product was dissolved in about 200 cc. of ether, washed successively with an equal volume of distilled water, with 200 cc. of 5 per cent by weight sodium carbonate solution, with 200 cc. of 5 per cent by weight sodium thiosulfate solution, and finally with 200 cc. of distilled water. The ether solution so treated was then dried over anhydrous magnesium sulfate and filtered. The ether was then removed from the mixture on a steam bath to yield 579 grams of a crude light yellow oil. This reaction mixture was fractionated under reduced pressure to obtain a yield of 73.2 per cent of 2,2,3,4,5,5-hexachlorothiolane.

*Example 4*

Two moles (170 grams) of thiophene and 20 grams (0.146 mole) of phosphorus trichloride were placed in a chlorination flask. Chlorine was bubbled into the cooled reaction flask at a temperature of 40° C. for one hour. Thereafter, the chlorination temperature was allowed to rise to 55–60° C. After about 6 hours of chlorination, the temperature of the reaction mixture fell, indicating that the thiophene had been completely chlorinated. The light yellow reaction mixture obtained was placed on an ice bath and the phosphorus chlorides were decomposed with cold water. The layers were separated and the reaction mixture was washed with a 5 per cent by weight sodium carbonate solution until the sodium carbonate solution was obtained without coloring. The oil was separated, washed with distilled water, and dried with anhydrous magnesium sulfate to yield 508 grams of a crude yellow oil. This material was fractionated under reduced pressure to give a yield of 75.2 per cent by weight of 2,2,3,4,5,5-hexachlorothiolane.

Hexachlorothiolane when added in minor proportions to lubricating oils improves their extreme pressure characteristics. The oil base of the present lubricating compositions is a lubricating oil of the type best suited for the particular use for which the ultimate composition is intended. The oil base employed will generally consist of a refined mineral lubricating oil of lubricating viscosity for the particular point of application. Thus, a conventional gear oil may be used for the lubrication of gears while usually a lighter, more highly refined oil will be employed for use in the crank case of automobiles.

The amounts of hexachlorothiolane present in the lubricating compositions of this invention will generally be such as to improve the extreme pressure characteristics of the oil. The amounts added for this purpose may be within the range of between about 0.1 per cent and about 20 per cent by weight and, more generally, will be between about 1 per cent and about 10 per cent by weight. The oil base may also desirably contain other well known constituents, such as those which improve the oiliness, pour point, cold test, oxidation properties, etc., of the oil. Hexachlorothiolane may generally be employed with any of the commercially available addition agents for the above defined purposes since they are usually compatible with the same in the amounts ordinarily used.

The beneficial results obtained by adding varying amounts of hexachlorothiolane to gear oils may be shown by standard lubricant tests, such as the Almen load test and the S. A. E. gear oil test. The Almen load test consists of placing a 30-gram sample of the lubricant to be tested in a small metal cup of the Almen test machine. The cup is provided with a ¼" drill rod shaft rotating in a split bushing at 600 revolutions per minute. Weights are added at ten-second intervals over a period of 5 minutes to a loading lever working to apply pressure on the split bushing. The Almen value is expressed as the number of weights. Each weight weighs 2 pounds and is equivalent to 1000 pound per square inch pressure. Torque meter readings are valuable as indications of the friction developed in the test. The S. A. E. gear oil test consists of placing a 120-gram sample of the lubricant to be tested in the standard S. A. E. gear test machine and the two steel test rings thereof are then adjusted in place. The shafts rotate the rings at different speeds against each other in the same direction so as to produce a combination of rolling and sliding action while a gradually increasing load is applied. The main shaft rotates at 1000 revolutions per minute. The loading rate is 75 pounds per minute and the test is continued until scoring occurs.

Results of the foregoing tests using a solvent-refined Mid-Continent oil having a Saybolt Universal viscosity of 67 seconds at 210° F. with and without a minor proportion of hexachlorothiolane are given below:

| Amount of 2,2,3,4,5,5-Hexachlorothiolane % by weight | S. A. E. Test Lbs. Scale | Almen Load Test | |
|---|---|---|---|
| | | Wts. | Torque |
| None | 20 | 3 | Test Specimen seized. |
| 5 | 335 | 8 | 20. |

The present invention may be embodied in other specific forms without departing from the spirit or essential attributes thereof and it is therefore desired that the present embodiments be considered in all respects as illustrative and not restrictive, reference being had to the appended claims rather than to the foregoing description to indicate the scope of the invention. This application is a division of co-pending application Serial Number 747,327, filed May 10, 1947, which, in turn, is a continuation-in-part of application Serial Number 613,202 (now abandoned), filed August 28, 1945.

We claim:
1. A lubricant comprising, in combination, a major proportion of an oil of lubricating viscosity and a minor proportion, sufficient to improve the extreme pressure characteristics of the oil, of 2,2,3,4,5,5-hexachlorothiolane.
2. A lubricant comprising, in combination, a major proportion of an oil of lubricating viscosity and between about 0.1 and about 20 per cent by weight of 2,2,3,4,5,5-hexachlorothiolane.
3. A lubricant comprising, in combination, a major proportion of an oil of lubricating viscosity and between about 1 and about 10 per cent by weight of 2,2,3,4,5,5-hexachlorothiolane.

HENRY D. NORRIS.
JOHN H. McCRACKEN.

REFERENCES CITED

The following references are of record in the file of this patent:

UNITED STATES PATENTS

| Number | Name | Date |
|---|---|---|
| 2,204,620 | Prutton et al. | June 18, 1940 |